United States Patent
Khanka et al.

(10) Patent No.: US 8,180,357 B2
(45) Date of Patent: May 15, 2012

(54) FREQUENCY BAND CLASS CONTROL FOR A WIRELESS COMMUNICATION DEVICE

(75) Inventors: Bhagwan Singh Khanka, Lenexa, KS (US); Anoop Kumar Goyal, Overland Park, KS (US); Hemanth Balaji Pawar, Herndon, VA (US); Shilpa Kowdley Srinivas, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 856 days.

(21) Appl. No.: 12/251,680

(22) Filed: Oct. 15, 2008

(65) Prior Publication Data

US 2010/0093281 A1    Apr. 15, 2010

(51) Int. Cl.
*H04W 72/00* (2009.01)
*H04K 3/00* (2006.01)

(52) U.S. Cl. .................. 455/451; 455/452.1; 455/453

(58) Field of Classification Search .............. 455/41.2, 455/450–454
See application file for complete search history.

(56) References Cited

U.S. PATENT DOCUMENTS

| | | | |
|---|---|---|---|
| 4,670,899 A | 6/1987 | Brody et al. | |
| 6,069,871 A | 5/2000 | Sharma et al. | |
| 2005/0070280 A1 | 3/2005 | Jung et al. | |
| 2005/0073977 A1 | 4/2005 | Vanghi et al. | |
| 2006/0128394 A1* | 6/2006 | Turina et al. | 455/453 |
| 2006/0142021 A1 | 6/2006 | Mueckenheim et al. | |
| 2007/0123252 A1 | 5/2007 | Tronc et al. | |
| 2007/0197220 A1 | 8/2007 | Willey | |
| 2009/0180403 A1* | 7/2009 | Tudosoiu | 370/278 |

FOREIGN PATENT DOCUMENTS

WO    2005060296    6/2005

* cited by examiner

*Primary Examiner* — Lee Nguyen

(57) ABSTRACT

A wireless access node provides a wireless communication service to a plurality of wireless communication devices over a first frequency band class, where a set of the wireless communication devices are currently in idle mode. A node control system detects a condition for the first frequency band class, and in response, transitions a subset of the wireless communication devices that are currently in idle mode to a second frequency band class. The wireless access node then provides the wireless communication service to the subset of the wireless communication devices over the second frequency band class.

16 Claims, 6 Drawing Sheets

FREQUENCY BAND CLASS CONTROL FOR A WIRELESS COMMUNICATION DEVICE

TECHNICAL BACKGROUND

Wireless communication devices exchange signaling with base stations to obtain wireless communication services, such as telephony and Internet access. These wireless communication devices may be in active mode where the signaling is continuously exchanged, or the devices may be in idle mode where they are substantially dormant—only waking up periodically to briefly exchange signaling.

The wireless communication devices and base stations wirelessly communicate over frequency band classes. A frequency bans class is a section of the spectrum that is individually licensed by the Federal Communication Commission (FCC). In the past, wireless communication devices typically operated over a single frequency band class. At present, wireless communication devices are becoming available that can operate over multiple frequency band classes.

OVERVIEW

A wireless access node provides a wireless communication service to a plurality of wireless communication devices over a first frequency band class, where a set of the wireless communication devices are currently in idle mode. A node control system detects a condition for the first frequency band class, and in response, transitions a subset of the wireless communication devices that are currently in idle mode to a second frequency band class. The wireless access node then provides the wireless communication service to the subset of the wireless communication devices over the second frequency band class.

In some examples, the condition is band class loading as measured by number of wireless communication devices. In some examples, the subset of devices to transition is selected based on an amount of time in idle mode. In other examples, the subset of devices to transition is selected based on quality-of-service levels for the devices.

DETAILED DESCRIPTION

Figure 1:
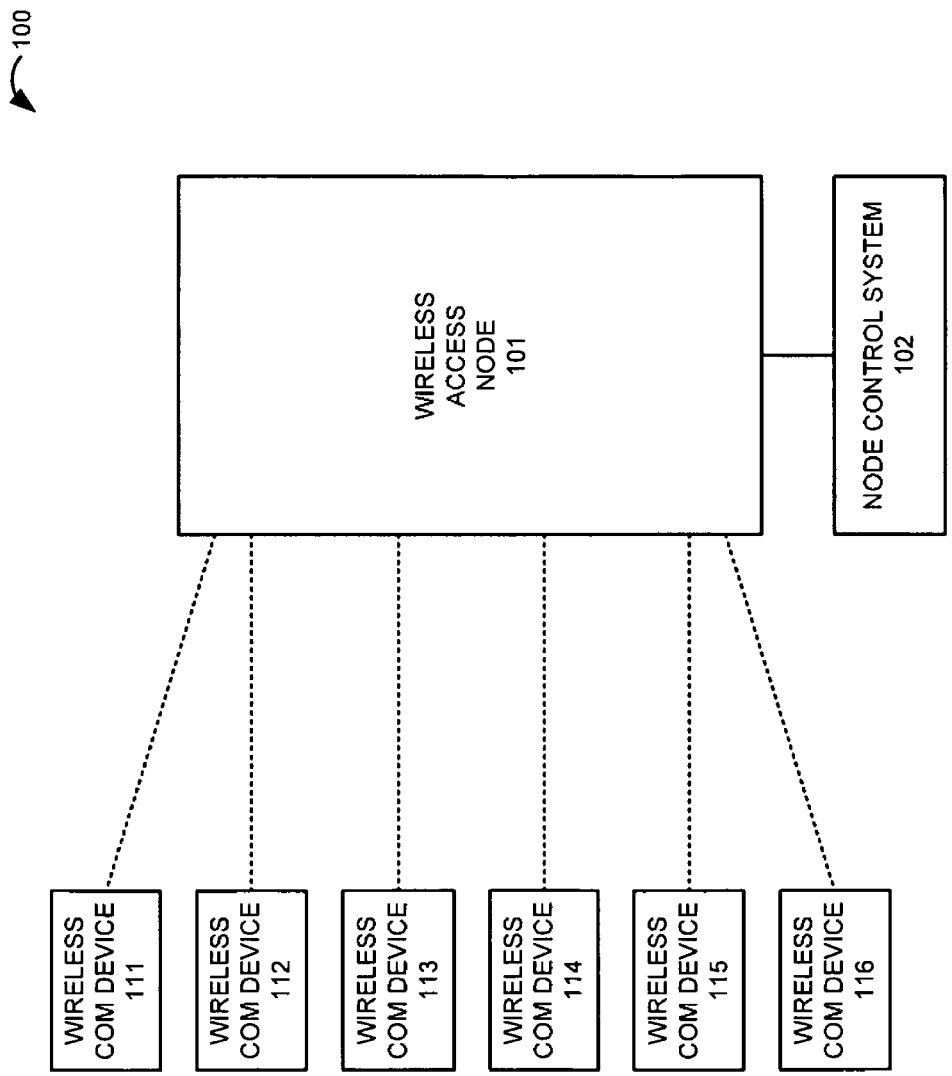
FIG. 1 illustrates a wireless communication system.

FIG. 1 is illustrates wireless communication system 100. Wireless communication system 100 includes wireless access node 101, node control system 102, and wireless communication devices 111-116. Wireless access node 101 and wireless communication devices 111-116 communicate over wireless communicate links. Wireless access node 101 and node control system 102 communicate over a direct communication link or through some combination of communication networks, systems, and links.

Wireless access node 101 comprises base stations, antennas, transceivers, amplifiers, filters, routers, servers, communication links, or some other communication components— including combinations thereof. Node control system 102 comprises software, memory, processing circuitry, and a communication interface. Node control system 102 may reside in a single device or may be distributed across multiple devices. Node control system 102 is shown externally to wireless access node 101, but node control system 102 could be integrated within the components of wireless access node 101.

Wireless communication devices 111-116 comprise telephones, RF transceivers, computers, digital assistants, Internet access devices, or some other wireless communication apparatus—including combinations thereof. The wireless communication links between wireless communication devices 111-116 and wireless access node 101 use the air or space as the transport media. These wireless communication links may use various protocols, such as wireless fidelity, code division multiple access, global system for mobile communications, worldwide interoperability for microwave access, long term evolution, internet, telephony, or some other communication format—including combinations thereof. The communication link between wireless access node 101 and node control system 102 (if any) uses metal, glass, air, space, or some other material as the transport media. This communication link could use various protocols, such as wireless fidelity, code division multiple access, global system for mobile communications worldwide interoperability for microwave access, internet, Ethernet, telephony, time division multiplex, or some other communication format— including combinations thereof.

Wireless access node 101 and wireless communication devices 111-116 are capable of implementing a wireless communication service using multiple frequency band classes. A frequency band class is a portion of the RF spectrum that is individually licensed by the Federal Communication Commission (FCC). For example, a first frequency band class could be Wireless Fidelity and a second frequency band class could be Evolution Data Only. In another example, the first frequency band class could be FCC band class 1 and the second frequency band class could be FCC band class 14. Responsive to a system condition, node control system 102 transitions selected wireless communication devices from one band class to another while those devices are in the idle mode.

Figure 2:
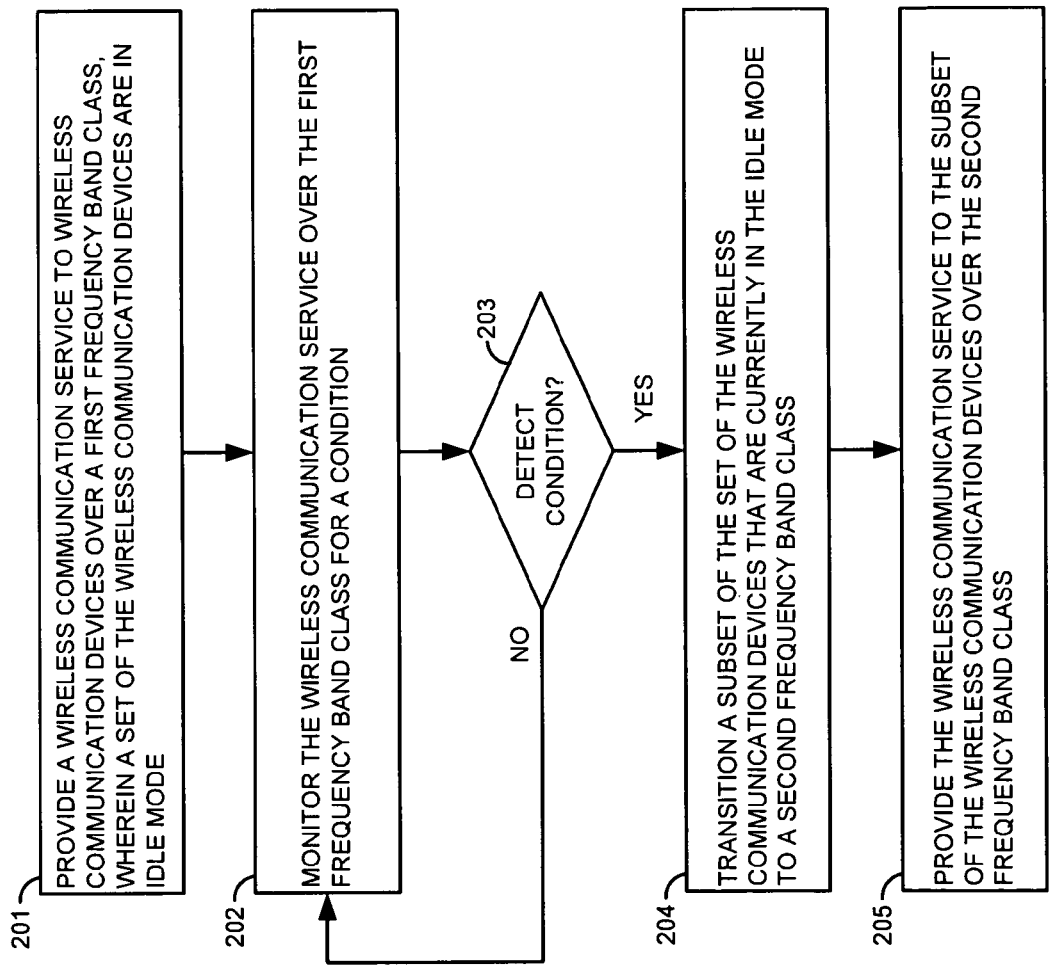
FIG. 2 illustrates the operation of the wireless communication system.

FIG. 2 illustrates the operation of wireless communication system 100. Wireless access node 101 provides a wireless communication service to wireless communication devices 111-116 over a first frequency band class (201). The wireless communication service comprises wireless access to other communication devices, communication networks, data systems, and/or media content. Wireless communication devices 111-112 are currently in active mode, and wireless communication devices 113-116 are currently in idle mode.

In active mode, wireless communication devices 111-112 have continuously active signaling channels with wireless access node 101, and may use those channels to request or accept wireless communications, such as voice calls, Internet access, video delivery, and the like. In idle mode, wireless communication devices 113-116 do not have continuously active signaling channels. In idle mode, wireless communication devices 113-116 are dormant for a set period of time before activating temporary signaling channels to briefly exchange information with wireless access node 101 (while remaining in idle mode), and then devices 113-116 return to dormant status for the set period of time. In idle mode, wireless communication devices 113-116 may also use the temporarily active signaling channels to request a transition to active mode.

Node control system 102 monitors wireless communication system 100 to detect a condition for the communication service over the first frequency band class (202). The condition occurs when a metric exceeds a threshold that is related to the wireless communication service over the first frequency band. The metric could be band class loading as measured by noise level, bandwidth, power usage, number of wireless communication devices, or some other loading indicator. The metric and threshold could be configurable based on the availability of the band classes and the market penetration of devices having capabilities in the band classes.

In response to detecting the condition (203), node control system 102 transitions a subset of the wireless communication devices that are currently in idle mode to a second frequency band class (204). The transition could be implemented by transferring transition instructions to the subset of wireless communication devices when they periodically exchange signaling during idle mode or exchange signaling to leave idle mode. In this example, the set of idle wireless communication devices includes devices 113-116, and the subset of these idle devices that are transitioned to the second frequency band class include devices 114-115. Node control system 102 may verify that individual wireless communication devices 113-116 have sufficient wireless coverage in the second frequency band class before initiating their band class transition.

Responsive to the transition, wireless access node 101 provides the wireless communication service to the subset of the wireless communication devices over the second frequency band class (205). Thus, wireless communication devices 114-115 now receive the communication service over the second frequency band class. Advantageously, the loading of the first frequency band class is reduced and the quality-of-service provided to the transitioned wireless communication devices may be enhanced.

Figure 3:
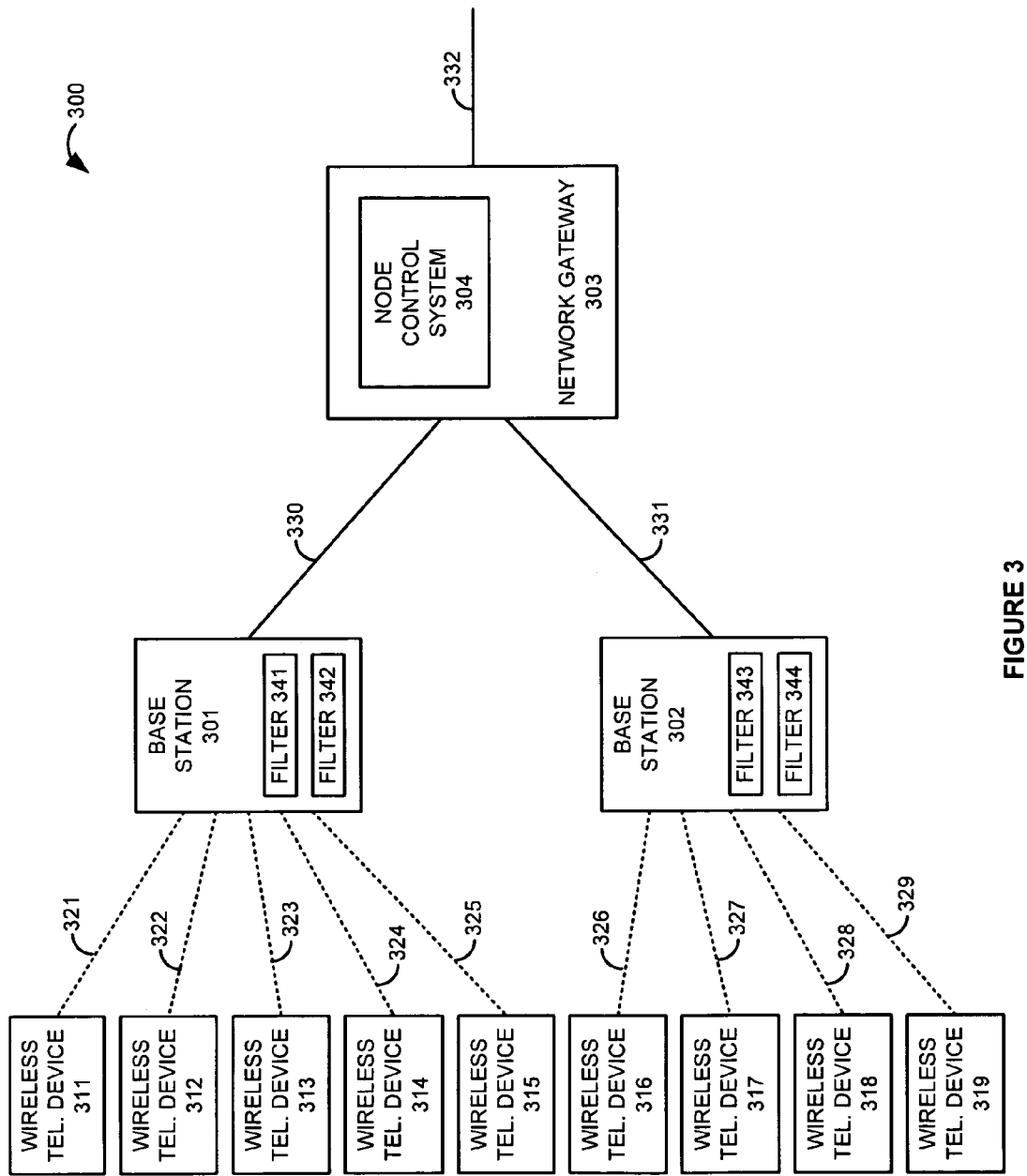
FIG. 3 illustrates a wireless communication system.

FIG. 3 illustrates wireless communication system 300. Wireless communication system 300 comprises base stations 301-302, network gateway 303, wireless telephony devices 311-319, and communication links 321-332. Network gateway 303 includes node control system 304. Base station 301 includes filters 341-342, and base station 302 includes filters 343-344. Filters 341 and 343 are bandpass filters that pass signals in FCC band class 1 and block signals in other frequency bands. Filters 342 and 344 are bandpass filters that pass signals in FCC band class 14 and block signals in other frequency bands.

Base stations 301-302 and wireless telephony devices 311-319 wirelessly communicate over communication links 321-329. Network gateway 303 and base stations 301-302 communicate over communication links 330-331. Network gateway 303 communicates with other systems over communication links 332. These other systems might include other wireless communication systems, telephone networks, data networks, core network, the Internet, or some other communication system.

Figure 4:
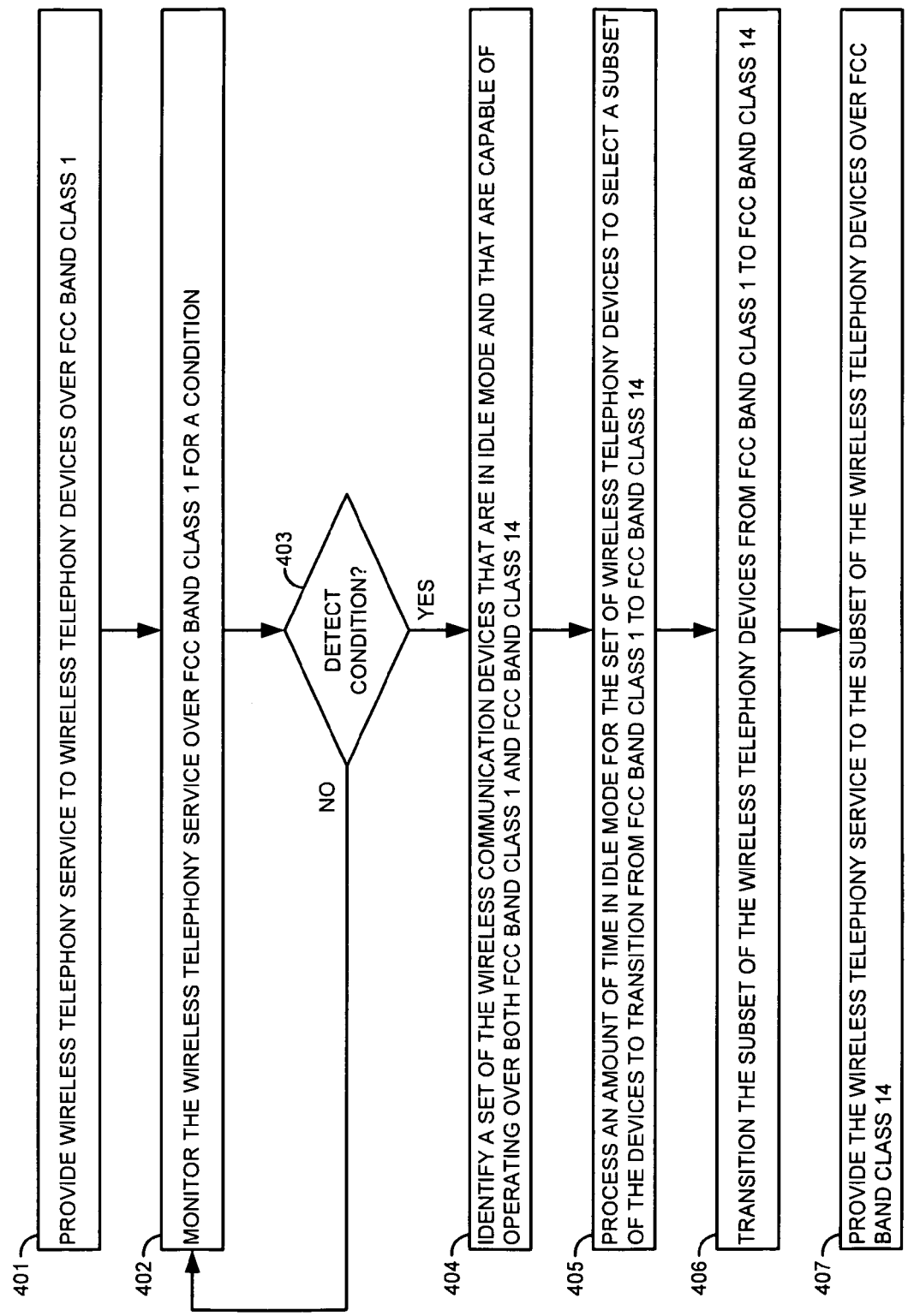
FIG. 4 illustrates the operation of the wireless communication system.

FIG. 4 illustrates the operation of wireless communication system 300. Base stations 301-302 use filters 341 and 343 to provide wireless telephony service to wireless telephony devices 311-319 over FCC band class 1 (401). Wireless telephony devices 311-312 and 316 are currently in active mode, and wireless telephony devices 313-315 and 317-319 are currently in idle mode. In active mode, wireless telephony devices 311-312 and 316 have continuously active signaling channels with base stations 301-302, and may use those channels to request or accept voice calls. In idle mode, wireless telephony devices 313-315 and 317-319 do not have continuously active signaling channels. In idle mode, wireless telephony devices 313-315 and 317-319 stay dormant for a set period of time before activating temporary signaling channels to briefly exchange information while remaining in idle mode, and then they go dormant again for the set period of time. In idle mode, wireless telephony devices 313-315 and 317-319 may also use the temporary signaling channels to request a transition to active mode.

Node control system 304 monitors system 300 to detect a condition for the wireless telephony service over FCC band class 1 (402). The detected condition occurs when a metric exceeds a threshold that is related to the wireless telephony service over the FCC band class 1. The metric could be a noise level, bandwidth measure, power usage, number of devices, or some other loading indicator. In response to detecting the condition (403), node control system 304 identifies a set of the wireless telephony devices that are in idle mode and that are capable of operating over both FCC band class 1 and FCC band class 14 (404). Network gateway 303 tracks the active/idle mode status of wireless telephony devices 311-319. Network gateway 303 also identifies the capability of telephony devices 311-319 to operate over both FCC band class 1 and FCC band class 14 during the registration process. Node control system 304 obtains this information from network gateway 303. In this example, wireless telephony devices 313-315 and 317-319 are in idle mode, and of these, wireless telephony devices are 314-315 and 318-319 are capable of operating over both FCC band class 1 and FCC band class 14. Thus, node control system 304 identifies telephony devices 314-315 and 318-319 as the set of devices that are in idle mode and that are capable of operating over both FCC band class 1 and FCC band class 14.

Node control system 304 processes the amount of time in idle mode for the set of wireless telephony devices 314-315 and 318-319 to select a subset of these devices to transition from FCC band class 1 to FCC band class 14 (405). In this example, wireless telephony devices are transitioned that have a time in idle mode that exceeds a threshold, although other techniques could be applied in other examples. In this example, wireless telephony devices 315 and 319 have been in idle mode for an amount of time that exceeds the threshold. Thus, wireless telephony devices 315 and 319 comprise the subset that will transition from FCC band class 1 to FCC band class 14.

Node control system 304 transfers messages to wireless telephony devices 315 and 319 instructing them to transition from FCC band class 1 to FCC band class 14 (406). Node control system 304 may also transfer similar messages to network gateway 303, base stations 301-302, or other suitable network elements in wireless communication system 300. In response to the messaging, base stations 301-302 use filters 342 and 344 to provide wireless telephony service to the subset of wireless telephony devices 315 and 319 over FCC band class 14 (406).

Figure 5:
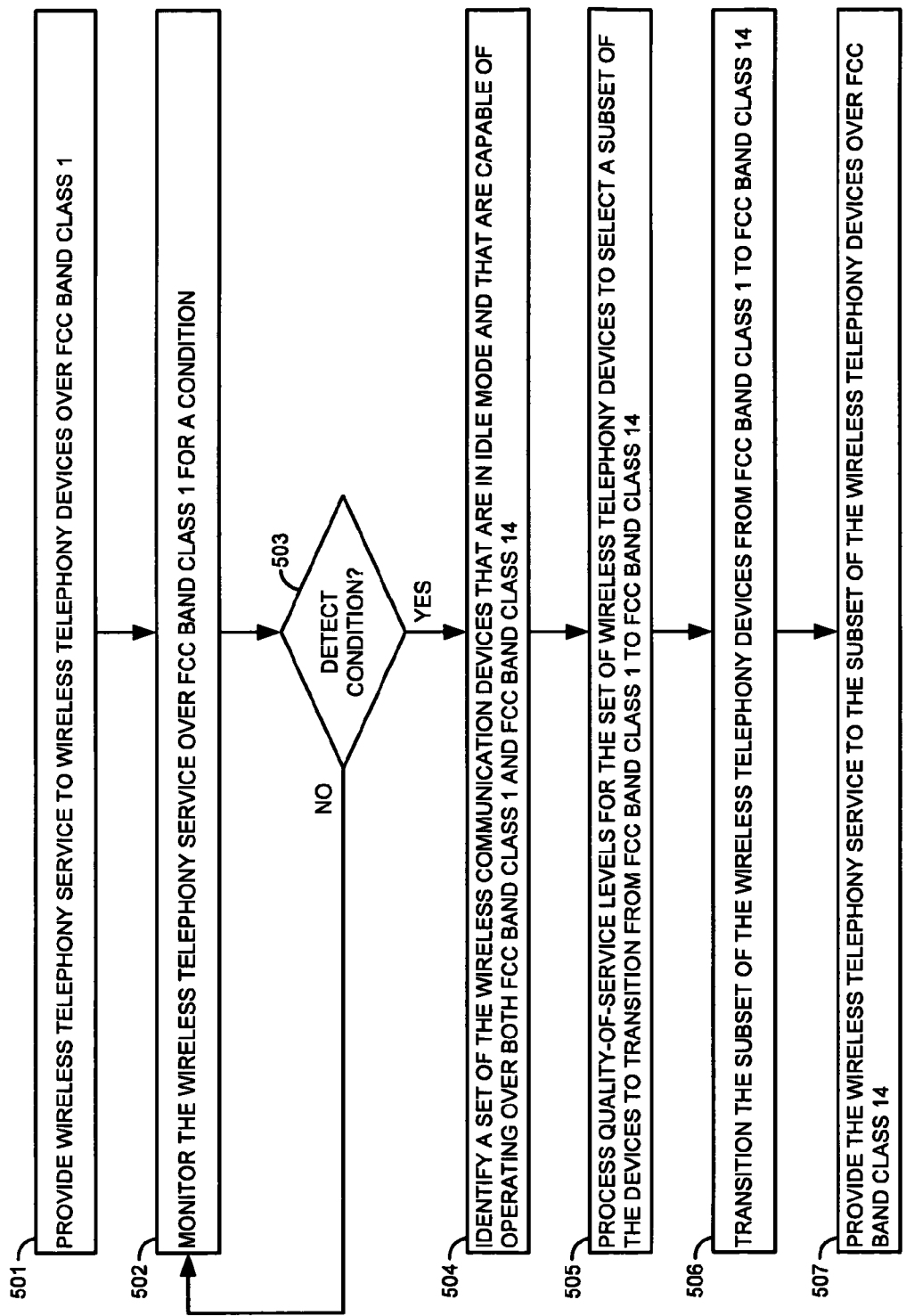
FIG. 5 illustrates an alternative operation of the wireless communication system.

FIG. 5 illustrates an alternative operation of wireless communication system 300. Base stations 301-302 use filters 341 and 343 to provide wireless telephony service to wireless telephony devices 311-319 over FCC band class 1 (401). Wireless telephony devices 311-312 and 316 are currently in active mode, and wireless telephony devices 313-315 and 317-319 are currently in idle mode. In active mode, wireless telephony devices 311-312 and 316 have continuously active signaling channels with base stations 301-302, and may use those channels to request or accept voice calls. In idle mode, wireless telephony devices 313-315 and 317-319 do not have continuously active signaling channels. In idle mode, wireless telephony devices 313-315 and 317-319 stay dormant for a set period of time before activating temporary signaling channels to briefly exchange information while remaining in idle mode, and then they go dormant again for the set period of time. In idle mode, wireless telephony devices 313-315 and 317-319 may also use the temporary signaling channels to request a transition to active mode.

Node control system 304 monitors system 300 to detect a condition for the wireless telephony service over FCC band class 1 (402). The detected condition occurs when a metric exceeds a threshold that is related to the wireless telephony service over the FCC band class 1. The metric could be a noise level, bandwidth measure, power usage, number of devices, or some other loading indicator. In response to detecting the condition (403), node control system 304 identifies a set of the wireless telephony devices that are in idle mode and that are capable of operating over both FCC band class 1 and FCC band class 14 (404). Network gateway 303 tracks the active/idle mode status of wireless telephony devices 311-319. Network gateway 303 also identifies the capability of telephony devices 311-319 to operate over both FCC band class 1 and FCC band class 14 during the registration process. Node control system 304 obtains this information from network gateway 303. In this example, wireless telephony devices 313-315 and 317-319 are in idle mode, and of these, wireless telephony devices are 314-315 and 318-319 are capable of operating over both FCC band class 1 and FCC band class 14. Thus, node control system 304 identifies telephony devices 314-315 and 318-319 as the set of devices that are in idle mode and that are capable of operating over both FCC band class 1 and FCC band class 14.

Node control system 304 processes quality-of-service levels for the set of wireless telephony devices 314-315 and 318-319 to select a subset of the devices to transition from FCC band class 1 to FCC band class 14 (505). The quality-of-service levels for individual wireless telephony devices could be stored in node control system 304 or could be obtained from network gateway 303 or a customer information server in communication system 300. The quality-of-service levels could use levels, such as gold, silver, and bronze, or could use some other customer grouping. In this example, the wireless telephony devices in the highest quality-of-service level are transitioned, although other techniques could be applied in other examples. In this example, wireless telephony devices 315 and 319 have the highest quality-of-service level. Thus, wireless telephony devices 315 and 319 comprise the subset of devices that are selected for transition from FCC band class 1 to FCC band class 14.

Node control system 304 transfers messages to wireless telephony devices 315 and 319 instructing them to transition from FCC band class 1 to FCC band class 14 (406). Node control system 304 may also transfer similar messages to network gateway 303, base stations 301-302, or other suitable network elements in wireless communication system 300. In response to the messaging, base stations 301-302 use filters 342 and 344 to provide wireless telephony service to the subset of wireless telephony devices 315 and 319 over FCC band class 14 (406).

Figure 6:
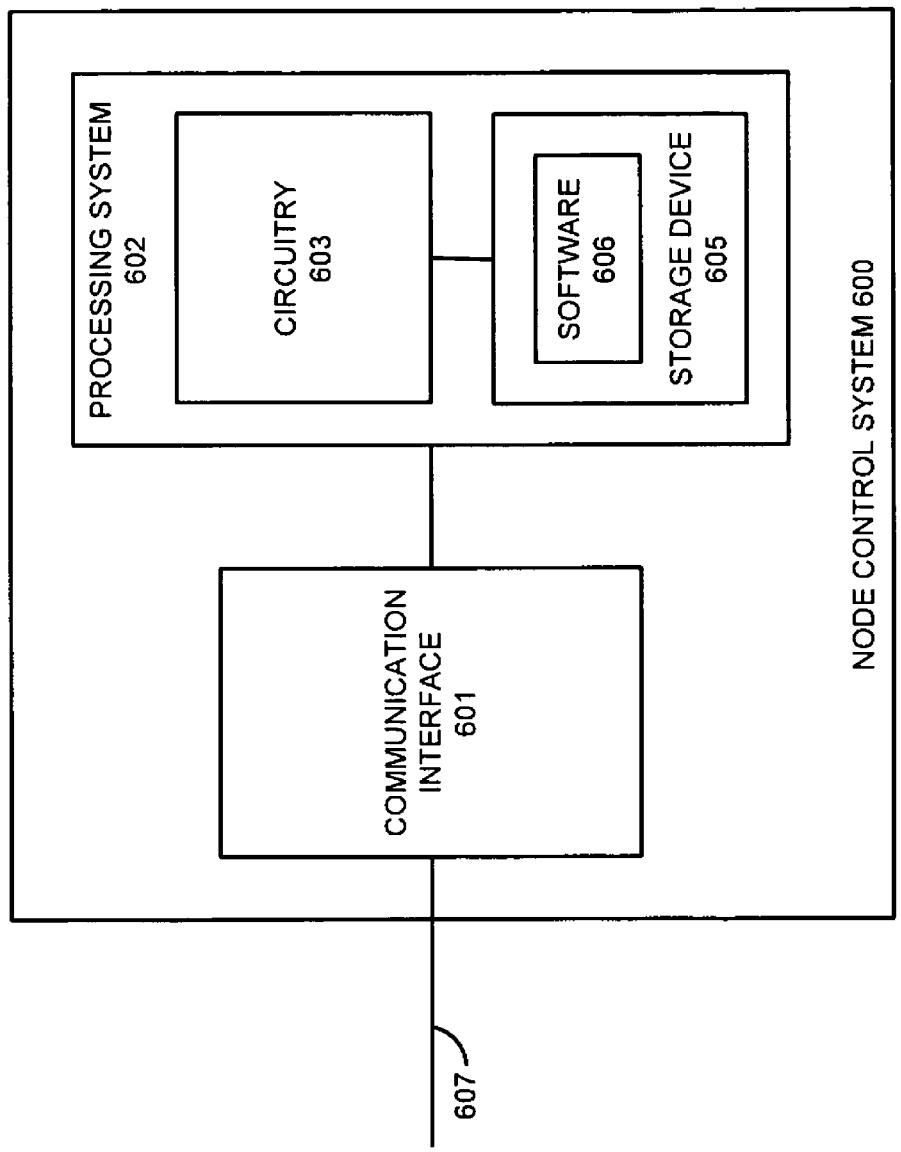
FIG. 6 illustrates a node control system.

FIG. 6 illustrates node control system 600. Node control system 600 provides on example of node control systems 102 and 304, although control systems 102 and 304 may use other configurations. Node control system 600 comprises communication interface 601 and processing system 602. Processing system 602 is linked to communication interface 601. Processing system 602 includes circuitry 603 and storage device 605 that stores operating software 606.

Communication interface 601 comprises components that transmit and receive communication signals over communication link 607 under the control of processing system 602. These components include transceiver and signal processing circuitry. The received communication signals include communication system performance information and wireless communication device status information. The transmitted communication signals identify band class transitions for the wireless communication devices.

Circuitry 603 comprises microprocessor and associated circuitry that retrieves and executes operating software 606 from storage device 605. Storage device 605 comprises a disk drive, flash drive, memory circuitry, or some other memory device. Operating software 606 comprises computer programs, firmware, or some other form of machine-readable processing instructions. Although storage device 605 is shown within node control system 600, a portion of storage device 605 could be externally located. For example, storage device 605 may comprise an external memory apparatus that stores software 606 for subsequent transfer to an internal disk drive within node control system 600.

When executed by circuitry 603, operating software 606 directs processing system 602 to operate node control system 600 as described herein for systems 102 and 304. In particular, operating software 606 directs processing system 602 to transition idle mode devices from one band class to another in response to a band class loading condition.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
  in a wireless access node, providing a wireless communication service to a plurality of wireless communication devices over a first frequency band class, wherein a set of the wireless communication devices are currently in idle mode;
  detecting a condition for the first frequency band class, and in response, identifying a subset of set of the wireless communication devices that are currently in the idle mode and that can operate over both the first frequency band class and a second frequency band class and transitioning the subset of the wireless communication devices to the second frequency band class for communication with the wireless access node;
  in the wireless access node, providing the wireless communication service to the subset of the wireless communication devices over the second frequency band class.

2. The method of claim 1 wherein identifying the subset of the wireless communication devices comprises selecting the subset based on an amount of time in the idle mode.

3. The method of claim 1 wherein identifying the subset of the wireless communication devices comprises selecting the subset based on quality-of-service levels.

4. The method of claim 1 wherein providing the wireless communication service over the first frequency band class comprises using a first bandpass filter that passes a first frequency band, wherein providing the wireless communication service over the second frequency band class comprises using a second bandpass filter that passes a second frequency band, and wherein the first frequency band and the second frequency band are mutually exclusive.

5. The method of claim 1 wherein detecting the condition for the first frequency band class comprises detecting that a noise metric for the wireless communication service over the first frequency band class exceeds a threshold.

6. The method of claim 1 wherein detecting the condition for the first frequency band class comprises detecting that a bandwidth for the wireless communication service over the first frequency band class exceeds a threshold.

7. The method of claim 1 wherein detecting the condition for the first frequency band class comprises detecting that a power usage for the wireless communication service over the first frequency band class exceeds a threshold.

8. The method of claim 1 wherein detecting the condition for the first frequency band class comprises detecting that a number of the wireless communication devices receiving the wireless communication service over the first frequency band class exceeds a threshold.

9. A wireless communication system comprising:
a wireless access node configured to provide a wireless communication service to a plurality of wireless communication devices over a first frequency band class, wherein a set of the wireless communication devices are currently in idle mode;
a node control system configured to detect a condition for the first frequency band class, and in response, identify the wireless communication devices in the set that are currently in the idle mode and that can operate over both the first frequency band class and a second frequency band class and transition the subset of the wireless communication devices to the second frequency band class for communication with the wireless access node;
the wireless access node further configured to provide the wireless communication service to the subset of the wireless communication devices over the second frequency band class.

10. The wireless communication system of claim 9 wherein the node control system is configured to identify the subset of the wireless communication devices by selecting the subset based on an amount of time in the idle mode.

11. The wireless communication system of claim 9 wherein the node control system is configured to identify the subset of the wireless communication devices by selecting the subset based on quality-of-service levels.

12. The wireless communication system of claim 9 wherein the wireless access node comprises a first bandpass filter that passes a first frequency band and a second bandpass filter that passes a second frequency band, wherein the first frequency band and the second frequency band are mutually exclusive, and wherein the wireless access node is configured to provide the wireless communication service over the first frequency band class using the first bandpass filter and to provide the wireless communication service over the second frequency band class using a second bandpass filter.

13. The wireless communication system of claim 9 wherein the node control system is configured to detect the condition for the first frequency band class by detecting that a noise metric for the wireless communication service over the first frequency band class exceeds a threshold.

14. The wireless communication system of claim 9 wherein the node control system is configured to detect the condition for the first frequency band class by detecting that a bandwidth for the wireless communication service over the first frequency band class exceeds a threshold.

15. The wireless communication system of claim 9 wherein the node control system is configured to detect the condition for the first frequency band class by detecting that a power usage for the wireless communication service over the first frequency band class exceeds a threshold.

16. The wireless communication system of claim 9 wherein the node control system is configured to detect the condition for the first frequency band class by detecting that a number of the wireless communication devices receiving the wireless communication service over the first frequency band class exceeds a threshold.

* * * * *